US012361789B2

(12) United States Patent
Macke et al.

(10) Patent No.: US 12,361,789 B2
(45) Date of Patent: *Jul. 15, 2025

(54) SYSTEMS AND METHODS FOR FACILITATING HAND COUNT TRANSFERS IN ELECTRONIC GAMING ENVIRONMENTS

(71) Applicant: Primero Games, LLC, Norcross, GA (US)

(72) Inventors: Michael Mayo Macke, Duluth, GA (US); Gregory S. Gronau, Duluth, GA (US); Jeremy M. Meister-Gronau, Duluth, GA (US); Mark C. Nizdil, Duluth, GA (US)

(73) Assignee: PRIMERO GAMES, LLC, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,413

(22) Filed: Jun. 22, 2023

(65) Prior Publication Data

US 2023/0334944 A1 Oct. 19, 2023

Related U.S. Application Data

(60) Continuation of application No. 17/357,024, filed on Jun. 24, 2021, now Pat. No. 11,727,752, which is a division of application No. 16/710,865, filed on Dec. 11, 2019, now Pat. No. 11,074,782.

(60) Provisional application No. 62/822,452, filed on Mar. 22, 2019.

(51) Int. Cl.
*G07F 17/32* (2006.01)

(52) U.S. Cl.
CPC ...... *G07F 17/3244* (2013.01); *G07F 17/3237* (2013.01); *G07F 17/3241* (2013.01)

(58) Field of Classification Search
CPC ............. G07F 17/3244; G07F 17/3241; G07F 17/3237
See application file for complete search history.

(56) References Cited

U.S. PATENT DOCUMENTS

| | | | | |
|---|---|---|---|---|
| 2004/0127280 A1* | 7/2004 | Moody | G07F 17/32 | 463/20 |
| 2007/0167235 A1* | 7/2007 | Naicker | G07F 17/3244 | 463/42 |

(Continued)

*Primary Examiner* — Steve Rowland
(74) *Attorney, Agent, or Firm* — Bradley Arant Boult Cummings LLP; Adam J. Thompson, Esq.

(57) ABSTRACT

Systems and methods are provided for movement of hand counts to a gaming device. A gaming device can process a request to add credits to a current credits value of a wagering game. The gaming device can generate one or more outcomes of the wagering game. The gaming device can increment the hand count value based on a count of the outcomes of the wagering game generated. The gaming device can determine that the current credits value exceeds a predetermined multiple of the hand count value. The gaming device can transfer an amount of hand count credit to the wagering game by adding the amount of hand count credit to the hand count value. The gaming device can perform a payout of the wagering game comprising decreasing the hand count value based on the payout value and the predetermined multiple of the hand count value.

20 Claims, 4 Drawing Sheets

(56) References Cited

U.S. PATENT DOCUMENTS

| | | | | |
|---|---|---|---|---|
| 2011/0053671 | A1* | 3/2011 | Aoki | G07F 17/32<br>463/16 |
| 2017/0092048 | A1* | 3/2017 | Fujisawa | G07F 17/3211 |
| 2019/0251792 | A1* | 8/2019 | Lamb | G07F 17/3211 |

* cited by examiner

SYSTEMS AND METHODS FOR FACILITATING HAND COUNT TRANSFERS IN ELECTRONIC GAMING ENVIRONMENTS

CROSS-REFERENCE TO RELATED APPLICATIONS

This application is a continuation of U.S. patent application Ser. No. 17/357,024, filed Jun. 24, 2021, and entitled "SYSTEMS AND METHODS FOR FACILITATING HAND COUNT TRANSFERS IN ELECTRONIC GAMING ENVIRONMENTS," which is a divisional application of U.S. patent application Ser. No. 16/710,865, now U.S. Pat. No. 11,074,782, filed Dec. 11, 2019, and entitled "SYSTEMS AND METHODS FOR FACILITATING HAND COUNT TRANSFERS IN ELECTRONIC GAMING ENVIRONMENTS," which claims the benefit of and priority under U.S. Provisional Patent Application No. 62/822,452, filed Mar. 22, 2019, and entitled "Hand Count Transfer," which is incorporated herein by reference in its entirety.

TECHNICAL FIELD

The present systems and methods relate generally to updating hand counts and facilitating hand count transfers in a gaming environment.

BACKGROUND

Previous solutions to facilitating payout events on gaming devices, and the like, fail to provide systems and methods for buffering patron hand counts with stored and transferred hand counts. For example, previous solutions may consider only current credits on a wagering game when deciding an amount to pay out. Consequently, previous solutions may not provide gaming systems that allow for adjustment and/or buffering of current hand count credits with historically accrued hand count credits. The lack of hand count transfers can result in undesirably insular and isolated gaming experience where award payouts are not calculated based on activities that occur outside of a single gaming session of a single device. Accordingly, there exists a long felt, but unresolved need for systems and methods that can store and transfer hand counts in a gaming environment.

BRIEF SUMMARY OF THE DISCLOSURE

The present systems and methods relate generally to updating hand counts and facilitating hand count transfers in a gaming environment. Briefly described, and according to one embodiment, aspects of the present disclosure relate generally to systems and methods for determining and updating hand counts, and for facilitating transfers of hand counts within and/or between gaming environments.

In at least one embodiment, as described herein, a "hand count" can refer to a number of instances of play initiated at one or more gaming devices, or the like, by one or more patrons. For example, a hand count can refer to a count of games played in a current gaming session provided via a gaming device. The hand count can include hand counts received in previous gaming sessions. Hand counts may be used by various gaming devices, game services, and/or game applications to determine: 1) whether or not a gaming device, gaming service, and/or gaming application can provide a payout; and 2) a magnitude of payout which a gaming device, gaming service, and/or gaming application may provide.

In an exemplary scenario, a gaming device may facilitate and provide a plurality of outcomes for one or more wagering games for a patron that initiated the wagering games. For each initiated wagering game, the gaming device, or other element connected thereto, may increment a hand count. The patron may initiate a payout to receive a current balance of credits (e.g., dollars, euros, yuan, or other currency or prize accrued via the plurality of outcomes). However, the gaming device may restrict the value of the payout to a value equal to a predefined multiple of the hand count. For example, the gaming device may restrict the payout value to a value equal to $5 times the hand count. Accordingly, there may be an incentive for a patron to achieve a sufficient number of hand counts such that a full value of a payout may be received.

In at least one embodiment, following a payout, a gaming device may decrement the current hand count based on the multiple of hand counts used to determine the payout value. For example, prior to a payout of $50, a patron may have a current hand count of fifteen. To process a full payout, a gaming device may determine that: 1) the patron requires a hand count of ten (e.g., by computing $50 divided by $5); and 2) the patron possesses a hand count of at least ten. Also, to process the payout, the system may award the $50 payout value, and may decrement the patron's hand count by ten, thereby leaving the patron with a hand count of five. As another example, prior to a payout of $50, a patron may have a current hand count of five. To process a full payout, a gaming device may determine that: 1) the patron requires a hand count of ten (e.g., by computing $50 divided by $5); 2) the patron possesses a hand count of five. Also, to process the payout, the system may award the $25 payout value, and may decrement the patron's hand count by 5, thereby leaving the patron with a hand count of zero.

In one or more embodiments, the present systems and methods may provide for storage and transfer of hand counts (e.g., that are associated with a particular patron, one or more patrons, or one or more patron sets). For example, a game application on a gaming device may increment and/or initialize a hand count value by receiving hand count credits from a database via a gaming service, via an attendant, or from some other manner. In the same example, upon receiving the hand count credits, the game application may initialize or increment a hand count value based on the transferred hand count credit. Also, upon transmitting the hand count credits, the gaming service may decrement a stored hand count value based on the number of transferred hand count credits. As another example, following payout and decrement of a hand count, a gaming device (or a component connected thereto) may transfer the remaining hand count (or decremented hand count value) to a gaming service. Upon receiving the remaining hand count, the gaming service can increment or decrement a stored hand count value based on the remaining hand count, thereby maintaining an accurate measurement of a patron's current hand count credits.

The systems and methods provided herein may perform hand count transfer processes automatically and/or in response to receiving manual selections (e.g., from a patron, via a gaming device). For example, a gaming device may automatically detect that a patron does not possess a hand count sufficient for allowing payout of a full payout value. In the same example, the gaming device may automatically request, from a gaming service, transfer of hand count credits in a magnitude sufficient to increment the patron's hand count to a value that results in payout of the full payout value. The gaming service, upon receiving the request, can determine if the patron possesses stored hand count credits, and may automatically transfer a number of hand count credits to the gaming device that would allow for full payout of the payout value (or otherwise allow the gaming device to maximize payout of a payout value). Upon receiving the hand count credits, the gaming device can increase the session hand count on the wagering game and payout the payout value accordingly.

In one or more embodiments, the systems and methods provided herein may allow for storage and/or retention of current credit balances also referred to herein as a wagering credit balance, which includes both monetary and non-monetary credit based wagering games. For example, a patron at a first gaming device may obtain a credit balance of $158 (e.g., by winning wagering games). However, the patron may only possess a hand count of ten (e.g., ten hand count credits), and, thus, the first gaming device may only provide a $50 payout (equal to ten times the hand count-payout ratio of $5). Accordingly, the patron may still possess a remaining credit balance of $108. The wagering game may transmit the remaining credit balance of $108 to a gaming service. The gaming application and/or gaming service may store the $108 credit balance.

Following the storage, the same patron may initiate wagering games at a second gaming device (which includes a subsequent session at the first gaming device), and may obtain an additional ten hand counts, but may not have achieved a new credit balance meeting the threshold limit for ten hand counts (e.g., the patron lost all credits or has credits less than ten times the per hand count payout threshold). The system may automatically (and/or in response to processing a selection) determine that the patron now has hand count credits, thereby allowing the second gaming device to payout a portion of the stored $108 credit balance. Based on the determination, the system may automatically (and/or in response to receiving a selection) provide an additional payout (e.g., equal to ten times the hand count payout ratio, e.g., of $5, minus any existing credits on the gaming device). As an example, the second gaming device may have $8.05 in remaining credits, and a cash out event can pay out $50 (equal to ten times an exemplary $5 hand count payout ratio) with $8.05 coming from the gaming device and $41.95 coming from the stored credit balance. In at least one embodiment, the system may continuously and/or automatically pay out stored credit balances upon determining that a patron possess hand count credits, or the like, sufficient to facilitate payout.

According to a first aspect, a system including: A) a memory including a hand count value; and B) a computing device in communication with the memory, the computing device being configured to at least: 1) receive an indication of an amount of hand count credit; 2) increment the hand count value by the amount of hand count credit; 3) generate at least one outcome of the wagering game; 4) increment the hand count value based at least in part on a number of the at least one outcome of the wagering game generated; and 5) determine a payout of the wagering game based at least in part on the hand count value.

According to a second aspect, the system of the first aspect or any other aspect, wherein the computing device is further configured to determine the payout by limiting the payout to a multiple of the hand count value.

According to a third aspect, the system of the second aspect or any other aspect, wherein the computing device is further configured to decrement the hand count value by a value corresponding to rounding up a result of the payout divided by the multiple of the hand count value.

According to a fourth aspect, the system of the third aspect or any other aspect, wherein the indication of the amount of hand count credit is received from a gaming service, and the computing device is further configured to transmit the decremented hand count value to the gaming service in response to the payout.

According to a fifth aspect, the system of the third aspect or any other aspect, wherein sending the decremented hand count value includes transmitting the decremented hand count value to a gaming service that increments a stored hand count credit based on the decremented hand count value.

According to a sixth aspect, the system of the first aspect or any other aspect, wherein the computing device is further configured to initialize a hand count value of a wagering game to zero.

According to a seventh aspect, a system including: A) a data store; and B) at least one computing device in communication with the data store, the at least one computing device being configured to at least: 1) receive a message from a first gaming device indicating a quantity of remaining hand count credits, the message indicating a patron identifier associated with a user account; 2) store the quantity of remaining hand count credits in the data store associated with the patron identifier; 3) receive, from a second gaming device, an authentication request corresponding to the user account; and 4) in response to authenticating the user account, send a current quantity of hand count credits to the second gaming device, wherein the current quantity of hand count credits is based at least in part on the quantity of remaining hand count credits.

According to an eighth aspect, the system of the seventh aspect or any other aspect, wherein the at least one computing device is further configured to: A) receive a second message from the second gaming device indicating a quantity of remaining wagering credits exceeding a payout limit, the message indicating the patron identifier associated with the user account; and B) in response to authenticating the user account on a third gaming device, send a current quantity of wagering credits to the third gaming device, wherein the current quantity of wagering credits is based at least in part on the quantity of remaining wagering credits.

According to a ninth aspect, the system of the seventh aspect or any other aspect, wherein the at least one computing device is further configured to authorize printing of a ticket by the first gaming device for the quantity of remaining hand count credits in response to receiving the message.

According to a tenth aspect, the system of the seventh aspect or any other aspect, wherein the first gaming device and the second gaming device are configured to limit a payout to a multiple of a respective hand count value.

According to an eleventh aspect, the system of the seventh aspect or any other aspect, wherein the at least one computing device is further configured to at least: A) receive a second message from the second gaming device indicating a second quantity of remaining hand count credits, the message indicating the patron identifier associated with the user account; B) store the second quantity of remaining hand count credits in the data store associated with the patron identifier; C) receive a second authentication request corresponding to the user account from a third gaming device; and D) send a second current quantity of hand count credits to the third gaming device, wherein the second current quantity of hand count credits is based at least in part on the second quantity of remaining hand count credits.

According to a twelfth aspect, the system of the seventh aspect or any other aspect, wherein sending the current quantity of hand count credits causes the second gaming device to initialize a hand count value associated with a wagering game based on the current quantity of hand count credits.

According to a thirteenth aspect, the system of the seventh aspect or any other aspect, wherein the at least one computing device is further configured to at least receive, from the second gaming device, a payout request indicating the available payout exceeds a payout limit based on a session hand count of the second gaming device, wherein the current quantity of hand count credits is sent to the second gaming device further in response to the payout request indicating the available payout exceeds the payout limit.

According to a fourteenth aspect, a method including: A) generating, via a first gaming device, a plurality of outcomes of a wagering game, a hand count value being incremented for each of the plurality of outcomes; B) determining, via the first gaming device, that a payout of the wagering game is less than a threshold amount, the threshold amount being a multiple of the hand count value; C) decrementing, via the first gaming device, the hand count value based at least in part on the payout of the wagering game and the multiple of the hand count value; and D) transferring a remaining balance of the hand count value from the first gaming device to a second gaming device.

According to a fifteenth aspect, the method of the fourteenth aspect or any other aspect, further including incrementing, via the second gaming device, a second hand count value corresponding to the second gaming device based at least in part on the remaining balance.

According to a sixteenth aspect, the method of the fifteenth aspect or any other aspect, further including generating, via the second gaming device, a plurality of second outcomes of the second wagering game, the second hand count value being incremented for each of the plurality of outcomes.

According to a seventeenth aspect, the method of the sixteenth aspect or any other aspect, further including limiting, via the second gaming device, a payout of the second wagering game based at least in part on the second hand count value.

According to an eighteenth aspect, the method of the fourteenth aspect or any other aspect, wherein the multiple of the hand count value is five dollars.

According to a nineteenth aspect, the method of the fourteenth aspect or any other aspect, wherein transferring the remaining balance of the hand count value including: A) sending the hand count value to a gaming service; and B) setting the hand count value to zero.

According to a twentieth aspect, the method of the nineteenth aspect or any other aspect, wherein transferring the remaining balance of the hand count value from the first gaming device to the second gaming device includes: A) receiving, via the gaming service, the hand count value from the first gaming device; B) storing, via the gaming service, the hand count value in a data store associated with a patron identifier associated with a user account; C) receive, via the gaming service, an authentication request corresponding to the user account from the second gaming device; and D) in response to authenticating the user account, sending the hand count value to the second gaming device.

BRIEF DESCRIPTION OF THE DRAWINGS

For a more complete understanding of the embodiments and the advantages thereof, reference is now made to the following description, in conjunction with the accompanying figures briefly described as follows.

Figure 1:
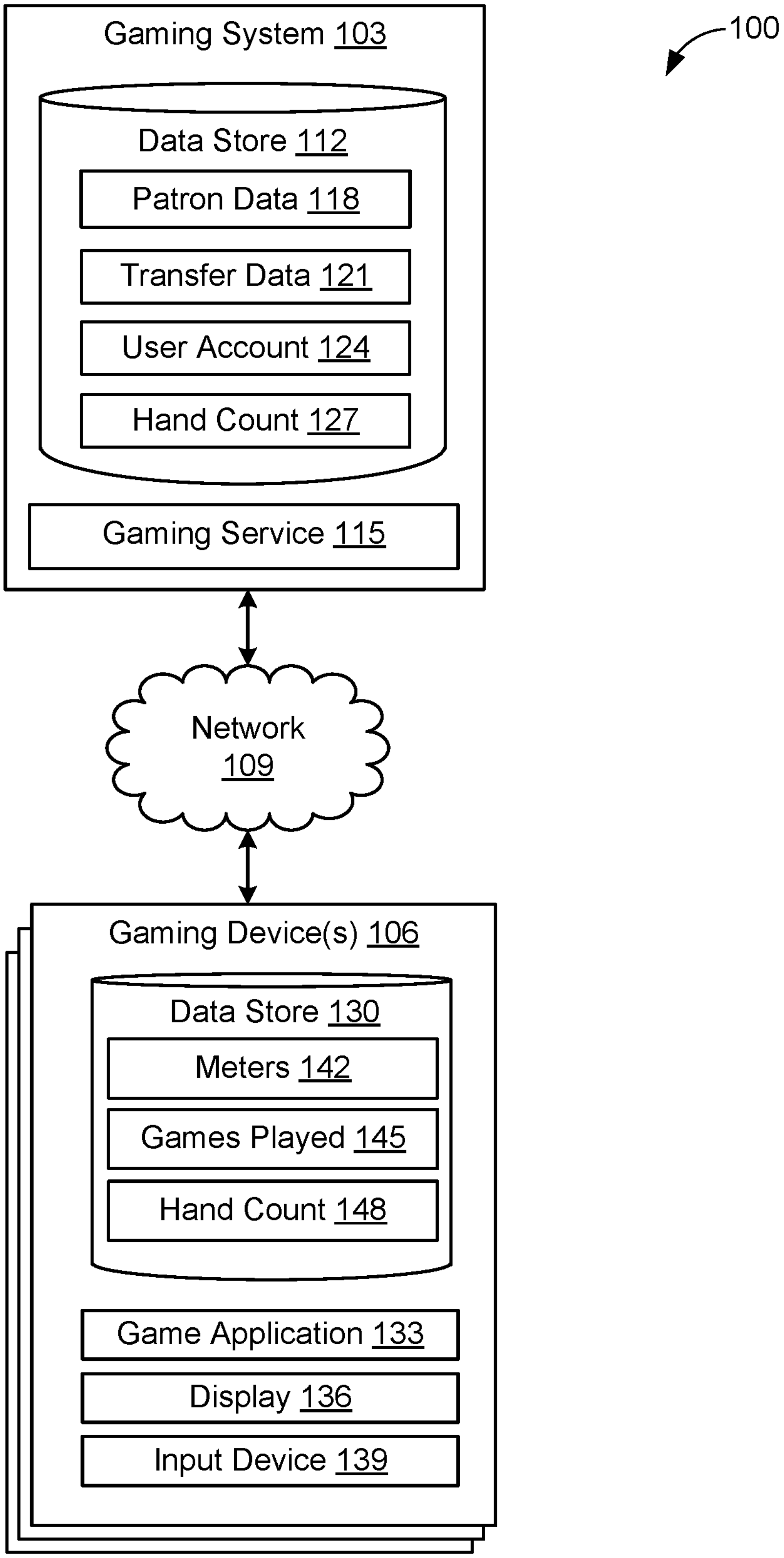
FIG. 1 is a drawing of a gaming environment according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein, the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

Turning now to the drawings, exemplary embodiments are described in detail. With reference to FIG. 1, shown is a gaming environment 100 according to various embodiments of the present disclosure. The gaming environment 100 includes a gaming system 103 and a gaming device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks.

The gaming system 103 can include, for example, a point of sale "POS" system, a server computer, or any other system providing computing capability. Alternatively, the gaming system 103 may employ a plurality of computing devices that may be arranged, for example, in one or more server banks or computer banks or other arrangements. Such computing devices can be located in a single installation or may be distributed among many different geographical locations. For example, the gaming system 103 can include a plurality of computing devices that together may include a hosted computing resource, a grid computing resource, and/or any other distributed computing arrangement. In some cases, the gaming system 103 can correspond to an elastic computing resource where the allotted capacity of processing, network, storage, or other computing-related resources may vary over time.

Various applications and/or other functionality may be executed in the gaming system 103 according to various embodiments. Also, various data is stored in a data store 112 that is accessible to the gaming system 103. The data store 112 can be representative of a plurality of data stores 112 as can be appreciated. The data stored in the data store 112, for example, is associated with the operation of the various applications and/or functional entities described below.

The components executed on the gaming system 103, for example, include a gaming service 115, and other applications, services, processes, systems, engines, or functionality not discussed in detail herein. The gaming service 115 can be executed to monitor game play on the one or more gaming devices 106 and facilitate additional features on the gaming devices 106. As an example, the gaming service 115 can facilitate the transferring of hand counts from one gaming device 106 to another gaming device 106 and awarding bonuses to a patron, among other features.

The data stored in the data store 112 includes, for example, patron data 118 and transfer data 121, and potentially other data. The patron data 118 can include user account 124 and hand count 127, and potentially other data. The user account 124 can include authentication credentials, a user identifier, contact information, user preferences, or other identifying information. The user identifier can correspond to an identifier stored in a magnetic strip of a patron tracking card. In some embodiments, the patron data 118 can correspond to an anonymous patron. As an example, a gaming session of an anonymous patron can be tracked as credits, hand counts, games played, tickets, or other trackable aspects are moved among gaming devices 106.

In other embodiments, hand counts can be transferred without utilizing the patron data 118. In these embodiments, a hand count transferred can be facilitated anonymously. For example, a first gaming device 106 can print a ticket that indicates a number of hand counts being transferred and a second gaming device 106 can add the number of hand counts from the ticket to the hand count 148 by redeeming the ticket. The ticketing information can be stored in transfer data 121. In another example, the gaming service 115 can receive an instruction from an attendant to transfer hand counts from a first gaming device 106 to a second gaming device 106. The transfer data 121 can store a history of transfers of hand count.

The gaming device 106 is representative of a plurality of gaming devices that may be coupled to the network 109. The gaming device 106 can include a data store 130, a game application 133, one or more displays 136, and one or more input devices 139, among other components. The data store 130 stores meters 142 including a number of games played 145 on the gaming device 106, a hand count 148, and potentially other values. The meters 142 can include an amount of money wagered on the gaming device 106 referred to as coin-in, an amount won by the gaming device 106 referred to as coin-out, a count of games played on the gaming device 106, an amount of credits currently on the gaming device 106 referred to as current credits, and various jackpot and bonus information, among other meters.

The hand count 148 can correspond to a number of games played in a current gaming session. A gaming session can start with the insertion of credits onto a game, with the authentication of a user account, or when some other trigger occurs. A gaming session can terminate when a patron cashes out a machine, when a patron logs out of the gaming devices, or some other trigger occurs. In one example, when credits are initially received by the game application 133, the hand count 148 can be initialized to zero. The hand count 148 can be initialized to or incremented by a hand count credit transferred from another gaming device 106 or gaming session.

In some embodiments, the hand count 148 can be determined as a delta of the current games played 145 plus a buffer value minus an initial games played 145 from when the gaming session started. The buffer value can correspond to hand count transferred from another gaming device 106 or gaming session.

In one or more embodiments, the hand count 127 can be a hand count value that is continuously incremented by the remaining hand count 148 (e.g., following conclusion of a gaming session). For example, the hand count 127 can be a hand count value that is increased by the hand count 148 (remaining after the payout is completed) each time a payout is initiated at the gaming device 106. In the same example, a patron associated with the hand count 148 and hand count 127 may be presented with indications of only the hand count 148, or only the hand count 127, or neither the hand count 148 nor the hand count 127, or both the hand count 148 and the hand count 127. The hand count 148 can be decremented based on a cash out event as described herein, and the decremented hand count 148 can be added to the hand count 127 if greater than zero.

According to one embodiment, the gaming system 103 can include a maximum hand count threshold associated with the hand count 127 and/or hand count 148. The maximum hand count threshold 128 can limit a maximum value of the hand count 127 and/or hand count 148 to a predetermined value. In one example, the gaming system 103 limits the hand count 127 to a maximum hand count threshold of about 133 hand count credits. The maximum hand count threshold can be based on a maximum payout value and a wagering game initialization value (e.g., coin-in required to initiate a wagering game.

For example, a gaming device 106 can include a maximum session (or daily) payout of $500 and a wagering game initialization value of $3.75; therefore, each hand count credit accrued at the gaming device 106 is associated with a coin-in value of $3.75. Based on the payout and initialization value, the gaming system 103 can set a maximum hand count threshold (for a hand count 148 or hand count 127) to about 133 or 134 hand counts.

The gaming system 103 can perform one or more actions upon the hand count 148 of a particular patron exceeding the maximum hand count threshold. The one or more actions can include, but are not limited to: 1) generating and transmitting an excess hand count notification to a gaming device 106, the gaming device 106 rendering the notification on the display 136 upon the particular patron initiating a wagering game; 2) limiting a magnitude of hand count credits that may be transferred from the gaming system 103 to the gaming device 106 or from the gaming device 106 to the gaming system 103; 3) disabling the gaming device 106; 4) disabling a current patron account; and 5) other actions. The gaming system 103 can restrict a transfer of hand count based on a maximum hand count threshold. As an example, the gaming device 106 may have an award of $400 to be paid with a current hand count total of 17. If the maximum hand count threshold is 133, the gaming device 106 can transfer up to 116 hand counts. In some embodiments, the hand count transfer can be restricted to a total necessary to payout the jackpot (e.g., 400), which in the above example would be 87 (107 at $3.75 to pay out $400 minus the existing 17 hand counts).

The gaming device 106 can include, for example, an amusement device, a slot machine, or other gaming device with a processor-based system such as a computer system. Such a computer system may be embodied in the form of a computing device in a slot machine cabinet, a desktop computer, a laptop computer, personal digital assistants, cellular telephones, smartphones, set-top boxes, music players, web pads, tablet computer systems, game consoles, electronic book readers, or other devices with like capability. The gaming device 106 can include a display 136. The display 136 can include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The input device 139 can include one or more buttons, touch screens including three-dimensional or pressure based touch screens, camera, finger print scanners, accelerometer, retinal scanner, gyroscope, magnetometer, or other input devices. The input device 139 can also include a bill acceptor, a player tracking module, a ticket printer, or some other device.

The gaming device 106 can be configured to execute various applications, such as the game application 133 and/or other applications. The game application 133 may be executed in a gaming device 106, for example, to access network content served up by the gaming system 103, and/or other servers, thereby rendering various user interfaces on the display 136. As an example, the game application 133 can render a player tracking user interface on the display 136 that may include or exclude a balance of the hand count 127. In some embodiments, the game application 133 can include, for example, a browser, a dedicated application, etc., and the user interface can be a network page, an application screen, etc. The gaming device 106 can be configured to execute applications beyond the gaming application 133 such as, for example, a patron tracking service window application, email applications, social networking applications, word processors, spreadsheets, and/or other applications.

Next, a general description of the operation of the various components of the gaming environment 100 is provided. To begin, a patron can insert money or a ticket into a bill accepter or coin accepter of the gaming device 106. The game application 133 can process the inserted currency or ticket and add credit to the current credits meter 142 (among potentially other meter changes). In some embodiments, the patron may pay an attendant to add credit to a particular gaming device 106. The patron can enter the credit into the gaming service 115, and the gaming service 115 can send a message to the game application 133 to add current credits to the gaming device 106.

The game application 133 can receive an indication of a value of hand count credit and add the value of hand count credit to the hand count 148. The indication of a value of hand count credit can be received in response to winning a bonus game, a top award, progressive award, or another award. The game application 133 can increment the hand count 148 by the received hand count credit. As an example, the game application 133 can process a ticket to determine the hand count credit. The ticket can be inserted into an input device 139. As another example, a patron can authenticate a patron account on the gaming device 106, such as, inserting a player tracking card into a player tracking module of the gaming device 106 or authenticating using another device via Near Field Communication (NFC), Bluetooth, or some other protocol. The player tracking information can be sent to the gaming service 115, and a hand count 127 from the user account 124 of the patron can be sent back to the game application 133. The game application can increment the hand count 148 based on the received hand count 127. The hand count credit can accompany the wagering credits. As an example, a single ticket can include hand count credits and game credits.

In some embodiments, a patron can utilize the player tracking module to request a number of hand count credits to be transferred to the gaming device 106. For example, a patron may have one hundred accrued hand counts stored in hand count 127, and may request ten of those hand counts to be transferred to a particular gaming device 106. In this example, the gaming service 115 may decrement the hand count 127 by ten and send the ten credits to the game application 133 corresponding to the particular gaming device 106.

The game application 133 can generate one or more outcomes of a wagering game. The term "wagering game" can include non-monetary wagering games or other amusement games, such as social games where virtual currency is wagered or skill-based games that involve wagering. A patron can initiate the wagering game via one or more of the input devices 139 on the gaming devices. As an example, the patron can press a button to initiate the wagering game. The game application 133 can generate one or more outcomes of the wagering game and update the meters 142 based on the outcomes of the wagering game. In one embodiment, the games played 145 and hand count 148 can be incremented by one for each game played. In some embodiments, the games played 145 and/or hand count 148 may be incremented by another amount based on various parameters, such as, for example, a number of lines being wagered in the wagering game, a denomination of the wager game, an eligibility for a bonus, or other parameter.

In some embodiments, the game application 133 can restrict the incrementing of the hand count 148 based on various parameters. In one example, the hand count 148 can be incremented only when an outcome of the wagering game results in a win. According to this example, if the game application 133 generates three wagering game outcomes with two of the outcomes paying an award and one of the outcomes not paying an award, the hand count 148 can be incremented by two.

The game application 133 and the game service 115 can restrict a payout of a gaming device 106 to a multiple of a value of the hand count 148. As an example, a patron can insert a $20 bill into a gaming device 106 that has no current credits to initiate a gaming session. The patron can initiate ten wagering games, thereby causing the game application 133, the gaming device 106, and/or the gaming service 148 to increment the value of the hand count 148 by ten. Following the ten wagering games, the game application 133 may include a current credit meter 142 that indicates the patron has accrued a current credits balance of $70 on the gaming device 106. If the game application 133 is configured to restrict the patron to receiving $5 per hand count, when a payout is initiated, the game application 133 can limit the payout to a value (e.g., $50) corresponding to the incremented value of the hand counts 148 (e.g., ten hand counts) multiplied by a hand count-payout ratio (e.g., $5).

The remaining $20 would be unavailable to the patron unless additional wagering games are played or more hand counts 148 are otherwise obtained. For example, the remaining $20 may be provided in a subsequent payout, if the patron initiates at least four additional wagering games (e.g., thereby incrementing a value of the hand count 148 by four). The usage of $5 per hand count multiple is for illustrative purposes only and other multiples can be used. The multiple can be set by the gaming service 115. In some embodiments, the multiple is fixed by regulators, while in other embodiments, an administrator can set the value via the gaming service 115. As another example, the patron may initiate a hand count transfer, which causes a gaming service 115 to transfer hand counts 127 to the game application 133, whereupon the patron's hand counts 148 can be increased by the amount of transferred hand counts 127. In the same example, increasing may include incrementing or increasing a hand count meter 142.

Further, a patron can have unutilized hand counts 148 when cashing out at a gaming device 106. In another example, the patron inserts $20 into the gaming device, plays ten wagering games, but has a current credit balance of $20 (e.g., as tracked via a current credit meter 142). In this example, when a payout is initiated, the game application 133 would initiate a payout of the full $20 and decrement hand count 148 by four leaving six hand count 148 on a hand count meter 142, or other hand count 148 tracking metric. In the same example, the remaining six hand counts 148 may be transferred to a gaming service 115, which increments hand counts 127 in proportion to the transferred hand counts 148, thereby storing the unused hand count credit for later use and/or transfer.

The game application 133 can receive a value of hand count credit and a game credits. It can be appreciated that a hand count credit can be transferred to the gaming device 106 at any time. The game application 133 can increment the hand count 148 by the hand count credit and the current credit meter 142 by the game credit (also called wagering credit). A patron can play one or more wagering games on the gaming device 106, and the game application 133 can increment the hand count 148 for each game played. Once finished, the patron can initiate a cash out of the game. The game application 133 can determine a payout of the wagering game. The payout can correspond to a value of the current credits on the game. For example, the payout can correspond to a current credit meter 142. However, the game application 133 can restrict the payout based to a preconfigured multiple of the hand counts 148. Further, the game application 133 can decrement the hand count 148 based on the payout.

According to one example, if the current credit exceeds a result of the preconfigured multiple multiplied by the hand count 148, the game application can payout the result of the preconfigured multiple multiplied by the hand count 148. Otherwise, the game application 133 can payout the current credits. Further, if the current credit exceeds a result of the preconfigured multiple multiplied by the hand count 148, the game application 133 can set the hand count 148 to zero. Otherwise, the game application 133 can decrement the hand count 148 by rounding up the result of the current credits divided by the preconfigured multiple.

In some embodiments, when a cash out occurs, the game application 133 can automatically send the value of any remaining hand count 148 to the gaming service 115. The remaining hand count 148 can be the value of hand count 148 subsequent to decrementing hand count 148 based on the payout. The value can include the patron identifier along with other data. Once the remaining hand count 148 is transferred to the gaming service 115, the game application 133 can set hand count 148 to zero.

In some embodiments, when a cash out occurs, the game application 133 can print a ticket. The printed ticket can include a value of the remaining hand count 148. In some embodiments, the game application 133 sends the remaining hand count 148 to the gaming service 115 (e.g., that increments a stored hand count 127). In one example, the gaming service 115 can send an identifier to be printed on the ticket. In another example, the game application 133 can determine a next sequential ticket number using a predetermined algorithm. When a patron redeems the ticket at another gaming device 106, the game application 133 can send the identifier read from the ticket to the gaming service 115 and receive back a value of hand count credit.

Figure 2:
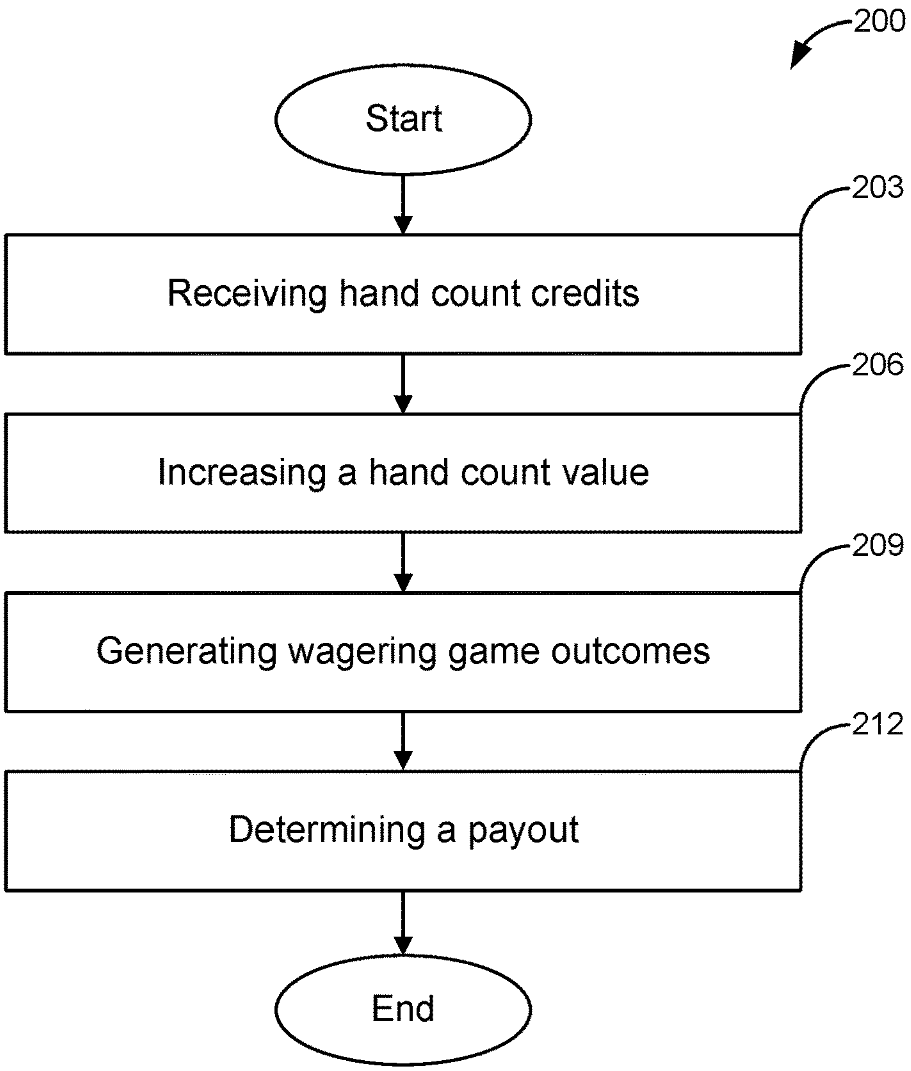
FIG. 2 illustrates an example flowchart of certain functionality implemented by portions of game application executed in a gaming device in the gaming environment of FIG. 1 according to various embodiments of the present disclosure.
Figure 3:
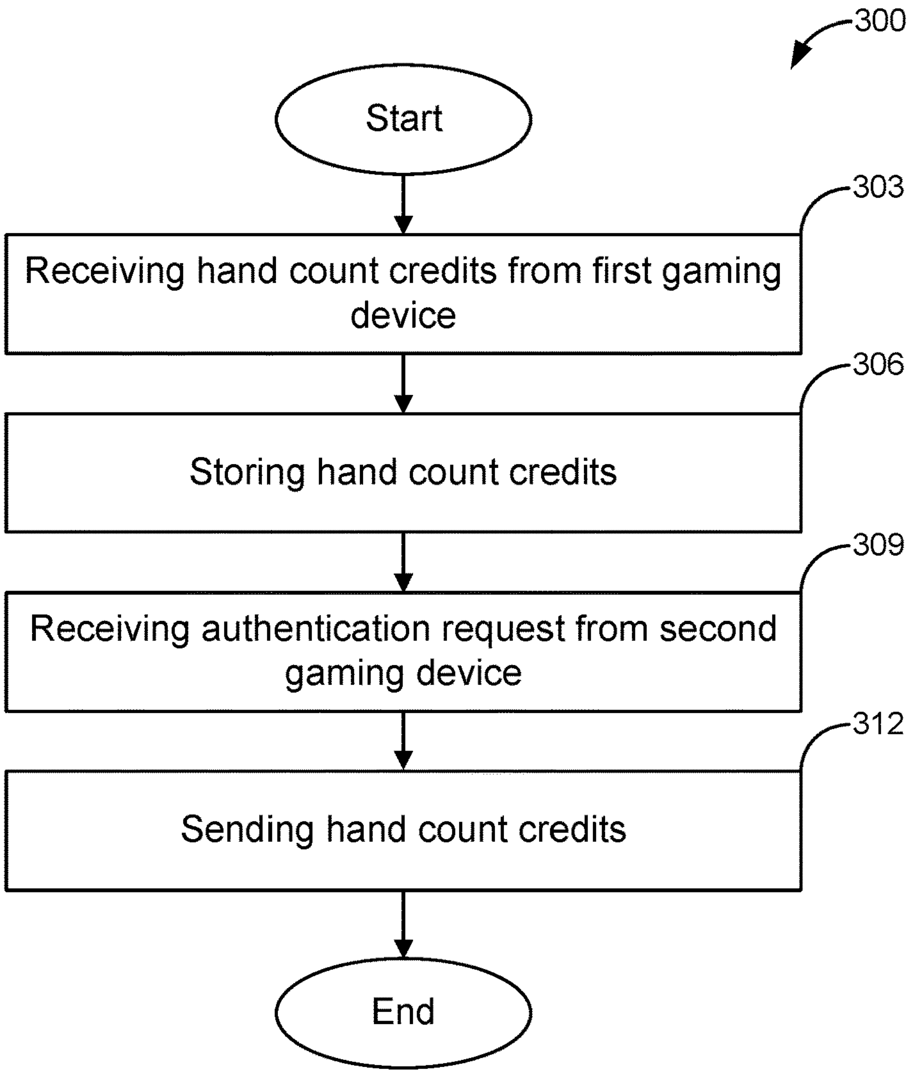
FIG. 3 illustrates an example flowchart of certain functionality implemented by portions of gaming service executed in a gaming system in the gaming environment of FIG. 1 according to various embodiments of the present disclosure.

Before turning to the process flow diagrams of FIGS. 2 and 3, it is noted that embodiments described herein may be practiced using an alternative order of the steps illustrated in FIGS. 2 and 3. That is, the process flows illustrated in FIGS. 2 and 3 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope of the embodiments.

With reference to FIG. 2, shown is a flow chart of a process 200 according to various embodiments of the present disclosure. At box 203, the process 200 includes receiving hand count credits. As an example, the game application 133 can receive hand count credits. The hand count credits can be received via a ticket inserted into a bill acceptor. In some embodiments, a patron can request a hand count transfer via a player tracking module. As an example, the game application 133 can render a player tracking user interface on the display 136 including a balance of the hand count 127 in the patron data 118. The patron can select a quantity of credit to transfer using one or more input devices 139. The game application 133 can communicate with the gaming service 115 to transfer hand count credits from the hand count 127 to the hand count 148.

At box 206, the process 200 includes increasing a hand count value of a gaming device. As an example, the game application 133 can increment the hand count 148 of the gaming device 106 based on the hand count credits received. The game application 133 can add the hand count credits to the hand count 148.

At box 209, the process 200 includes generating wagering game outcomes. As an example, the game application 133 can generate an outcome of a wagering game and render the results on the display 136. The game application 133 can increment the hand count 148 and games played 145 after each game is played. The game application 133 can increase or decrease the current credit meter 142 based on the outcome of the wagering game.

At box 212, the process 200 includes determining a payout for the wagering game. As an example, the game application 133 can receive an input from an input device 139 to initiate a cash out event. The game application 133 can calculate a payout for the wagering game. The payout can correspond to a current value of the current credit meter 142. However, the game application 133 can limit the payout to not more than the hand count 148 times a preconfigured multiple. The game application 133 can decrement the hand count 148 by rounding up the result of dividing the current credit meter 142 by the preconfigured multiple. The game application 133 can send the remaining hand count 148 to the gaming service 115 and set the hand count 148 to zero. The gaming service 115 can increment a stored hand count 127 in proportion to the transferred remaining hand count 148.

At box 212, to determine a payout for a wagering game, the system may automatically determine if a patron possesses stored hand count credits that may be transferred to a gaming device (or element thereof), thereby increasing the patron's current hand count. As an example, in a data store 130 of a gaming device 106, a patron may possess a current credits balance of $75 (e.g., as indicated by a current credit meter 142). In addition, the patron possess a current hand count 148 of ten. Upon receiving an input from an input device 139 to initiate a cash out event, the game application 133 can calculate a payout of $50 (e.g., equal to ten times the hand count-payout ratio of $5). Thus, the patron may possess a current hand count 148 sufficient to obtain only $50 of a $75 current credit. The game application 133 may automatically determine whether or not the patron has stored hand count credits that, if transferred to the gaming device 106, would allow the patron to receive a full payout. In at least one embodiment, the gaming device 106 and/or the gaming system 103 may automatically transfer any stored hand count 127 to the gaming application 133, thereby allowing for a maximum payout based on the patron's current and stored hand count credits. In the same example, the game application 133 may automatically communicate with the gaming system 103, and may determine (via one or more of patron data 118, transfer data 121, user account 124, and hand count 127) that the patron possesses five stored hand counts 127. The game application 133 and/or gaming system 103 may automatically transfer the five stored hand counts 127 to the patron's hand count 148 (e.g., as hand count credits), thereby allowing the gaming device 106 to provide the patron with a $75 payout.

At box 212, the system may automatically store a patron's current credits minus a payout value. For example, a patron may possess a current hand count 148 of ten. The patron may obtain, on a gaming device 106, a current credit balance of $75. A payout may be initiated at the gaming device 106, and, based on the current credit balance and current hand count 148, a game application 133 may provide a payout of $50. After payout processing, the patron may possess a hand count 148 of zero and a remaining current credit balance of $25, and the gaming application 133 may automatically transmit and store the $25 current credit balance within the gaming system 103. In the same example, the patron may initiate wagering games at a second gaming device 106, and may accrue a new hand count 148 of five, but accrue a new current credit balance of $0 (e.g., the patron lost all wagering games). A gaming application 133 and/or the gaming system 103 may determine that the patron now possesses a hand count 148 sufficient to facilitate payout of the patron's stored $25 current credit balance. Accordingly, the gaming system 103 may automatically transfer the stored $25 current credit balance to the second gaming device 106 that facilitates payout of the current credit balance via the patron's new hand count 148.

With reference to FIG. 3, shown is a flow chart of a process 300 according to various embodiments of the present disclosure. At box 303, the process 300 includes receiving hand count credits from a first gaming device. As an example, the gaming service 115 can receive a message from a game application 133 on a gaming device. The message can correspond to a transfer of hand count 148 off of the gaming device 106.

At box 306, the process 300 includes storing the hand count credits in a data store. The gaming service 115 can store the hand count in hand count 127 associated with a patron account. In some embodiments, the hand count can be stored in transfer data 121 during a transfer process to another gaming device 106. In at least one embodiment, the gaming service 115 can increment a stored hand count 127 in proportion to the transferred hand count 148. For example, at box 303, a gaming service 115 may receive eight hand counts 148 from a gaming device 106. The gaming service 115 may also receive a patron identifier that associates the transferred hand counts 148 with a patron and/or user identifier, patron data 118, and/or a user account 124. In the same example, at box 306, the gaming service 115 can increment a stored hand count 127 by eight, based on the eight transferred hand counts 127. The gaming service 115 may identify the stored hand count 127 by processing a patron and/or user identifier, processing patron data 118, and/or processing a user account 124.

At box 309, the process 300 includes receiving an authentication request from a second gaming device. A game application 133 executed by a second gaming device 106 can send an authentication request to the gaming service 115. As an example, a patron may insert a player card, the patron may insert a ticket into an input device 139, or a patron may enter authentication credentials, such as a user name and password. The game application 133 can send identifying information to the gaming service 115. The gaming service 115 can validate the identifying information against patron data 118, transfer data 121, and/or user account 124. As an example, the gaming service 115 can determine if the authentication credentials match those stored in user account 124. As another example, a ticket identifying can be validated against the transfer data 121.

At box 312, the process 300 includes sending hand count credits to the second gaming device. As an example, the gaming service 115 can send the hand count 127 corresponding to the patron to the game application 133. In some embodiments, the gaming service 115 can send a portion of the hand count 127. As another example, the gaming service 115 can send hand count credit stored in transfer data 121. The hand count credit may be stored associated with ticketing information for a ticket.

Figure 4:
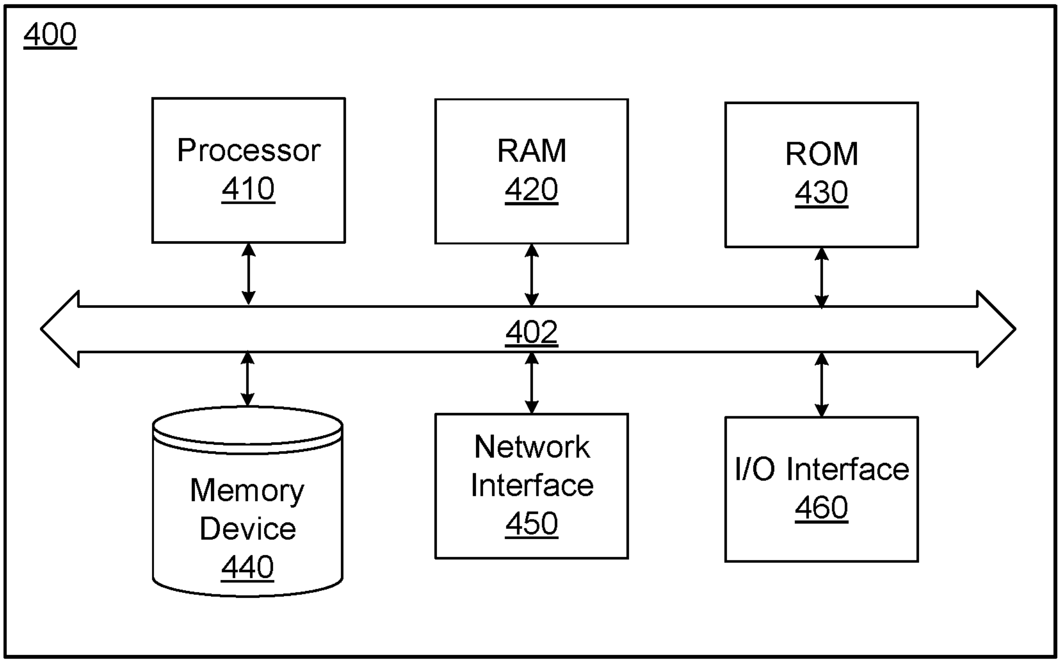
FIG. 4 is a schematic block diagram that illustrates an example computing environment employed in the gaming environment of FIG. 1 according to various embodiments.

Turning to FIG. 4, an example hardware diagram of a computing device 400 is illustrated. Any of the gaming system 103 or the gaming devices 106 may be implemented, in part, using one or more elements of the computing device 400. The computing device 400 can include one or more of a processor 410, a Random Access Memory ("RAM") 420, a Read Only Memory ("ROM") 430, a memory device 440, a network interface 450, and an Input Output ("I/O") interface 460. The elements of the computing device 400 are communicatively coupled via a bus 402.

The processor 410 can include an arithmetic processor, Application Specific Integrated Circuit ("ASIC"), or other types of hardware or software processors. The RAM 420 and ROM 430 can include a memory that stores computer-readable instructions to be executed by the processor 410. The memory device 440 stores computer-readable instructions thereon that, when executed by the processor 410, direct the processor 410 to execute various aspects of the present disclosure described herein. When the processor 410 includes an ASIC, the processes described herein may be executed by the ASIC according to an embedded circuitry design of the ASIC, by firmware of the ASIC, or both an embedded circuitry design and firmware of the ASIC. As a non-limiting example group, the memory device 440 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 450 can include hardware interfaces to communicate over data networks. The I/O interface 460 can include device input and output interfaces such as keyboard, pointing device, display, communication, and other interfaces. The bus 402 can electrically and communicatively couple the processor 410, the RAM 420, the ROM 430, the memory device 440, the network interface 450, and the I/O interface 460, so that data and instructions may be communicated among them.

In operation, the processor 410 is configured to retrieve computer-readable instructions stored on the memory device 440, the RAM 420, the ROM 430, or another storage means and copy the computer-readable instructions to the RAM 420 or the ROM 430 for execution, for example. The processor 410 is further configured to execute the computer-readable instructions to implement various aspects and features of the present disclosure. For example, the processor 410 may be adapted and configured to execute the processes described above with reference to FIGS. 2 and 3, including the processes described as being performed by the gaming system 103 or gaming devices 106. Also, the memory device 440 may store the data stored in the data store 112 or 130.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Therefore, at least the following is claimed:

1. A system comprising:

a memory comprising a hand count value; and a computing device in communication with the memory, the computing device being configured to at least:

process a request to add credits to a current credits value of a wagering game;

generate at least one outcome of the wagering game based on at least one input via an input device;

increment the hand count value based on a count of the at least one outcome of the wagering game generated; and determine that the current credits value exceeds a predetermined multiple of the hand count value;

generate a ticket comprising a ticket identifier for the hand count value, wherein the ticket is insertable into an accepter of a gaming device;

authenticate a user account associated with a current patron, the user account comprising a hand count credits value;

transfer an amount of hand count credit from the hand count credits value of the user account by adding the amount of hand count credit to the hand count value based on the insertion of the ticket into the accepter of the gaming device;

perform a payout of the wagering game; and decrease the hand count value based on a payout value and the predetermined multiple of the hand count value.

2. The system of claim 1, wherein the computing device is further configured to transfer the amount of hand count credit in response to receiving a request to perform the payout of the wagering game.

3. The system of claim 1, wherein the computing device is further configured to determine the amount of the hand count credit based on the current credits value divided by the predetermined multiple of the hand count value minus the hand count value.

4. The system of claim 1, wherein the computing device is further configured to decrement the hand count value based on a result of dividing the payout value by the predetermined multiple of the hand count value.

5. The system of claim 4, wherein the computing device is further configured to decrement the hand count value by a quantity equal to rounding up the result of dividing the payout value by the predetermined multiple of the hand count value.

6. The system of claim 1, wherein the request to add credits comprises at least one of: inserting money into a bill accepter or inserting the ticket into the bill accepter.

7. The system of claim 1, wherein the computing device is further configured to initialize the hand count value of the wagering game to zero.

8. A method comprising:

generating, via one of the one or more computing devices, at least one outcome of a wagering game based on at least one input via an input device;

incrementing, via one of the one or more computing devices, a hand count value based on a count of the at least one outcome of the wagering game generated; and determining, via one of the one or more computing devices, that a current credits value exceeds a predetermined multiple of the hand count value;

generating a ticket comprising a ticket identifier for the hand count value, wherein the ticket is insertable into an accepter of a gaming device;

authenticating, via one of the one or more computing devices, a user account comprising a hand count credits value;

transferring, via one of the one or more computing devices, an amount of hand count credit from the hand count credits value of the user account by adding the amount of hand count credit to the hand count value based on the insertion of the ticket into the accepter of the gaming device;

performing, via one of the one or more computing devices, a payout of the wagering game; and decreasing, via one of the one or more computing devices, the hand count value based on the payout value and the predetermined multiple of the hand count value.

9. The method of claim 8, further comprising performing a payout of the wagering game by limiting the payout to the predetermined multiple of the hand count value.

10. The method of claim 9, further comprising decrementing the hand count value by a value corresponding to rounding up a result of the payout divided by the multiple of the hand count value.

11. The method of claim 8, further comprising receiving, via a gaming service, a session hand count value from a first gaming device;

storing, via the gaming service, the hand count value in a data store associated with a patron identifier corresponding to the user account by adding the hand count value to the hand count credits value associated with the user account in the data store;

receive, via the gaming service, an authentication request comprising the patron identifier from one of the one or more computing devices; and subsequent to authenticating the patron identifier, performing the transfer of the amount of hand count credit to one of the one or more computing devices from the hand count credits value of the user account in the data store.

12. The method of claim 8, wherein the multiple of the hand count value is five dollars.

13. The method of claim 8, wherein the amount of hand count credit is transferred from a gaming service.

14. The method of claim 8, further comprising receiving a request to cash out the wagering game, wherein the determination that the current credit value exceeds the predetermined multiple of the hand count value is performed in response to receiving the request to cash out the wagering game.

15. A non-transitory computer-readable medium embodying a program that, when executed by at least one computing devices, causes the at least one computing devices to:

process a request to add credits to a current credits value of a wagering game;

generate at least one outcome of the wagering game based on at least one input via an input device;

increment a hand count value based on a count of the at least one outcome of the wagering game generated; and determine that the current credits value exceeds a predetermined multiple of the hand count value;

generate a ticket comprising a ticket identifier for the hand count value, wherein the ticket is insertable into an accepter of a gaming device;

authenticate a user account associated with a current patron of the wagering game, the user account comprising a hand count credits value;

transfer an amount of hand count credit to the wagering game from the hand count credits value of the user account by adding the amount of hand count credit to the hand count value based on the insertion of the ticket into the accepter of the gaming device; and perform a payout of the wagering game comprising decreasing the hand count value based on the payout value and the predetermined multiple of the hand count value.

16. The non-transitory computer-readable medium of claim 15, wherein the program further causes the at least one computing device to store an accrued hand count value in a data store associated with a patron identifier, wherein the amount of hand count credit transferred is deducted from the accrued hand count value.

17. The non-transitory computer-readable medium of claim 16, wherein the program further causes the at least one computing device to authenticate the user account associated with patron identifier prior to transferring the amount of hand count credit.

18. The non-transitory computer-readable medium of claim 15, wherein the multiple of the hand count value is five dollars.

19. The non-transitory computer-readable medium of claim 15, wherein the amount of hand count credit transferred comprises a current balance of hand counts stored in a data store associated with a current patron identifier.

20. The non-transitory computer-readable medium of claim 15, wherein the program further causes the at least one computing device to transfer the amount of hand counts equal to a sufficient number of hand counts such that a full value of a payout may be received, where the payout of the wagering game is limited to the predetermined multiple times the hand count value.

* * * * *